(12) United States Patent
Trainoff et al.

(10) Patent No.: US 11,971,392 B2
(45) Date of Patent: Apr. 30, 2024

(54) SEALING STRUCTURE FOR A FIELD FLOW FRACTIONATOR

(71) Applicant: Wyatt Technology, LLC, Goleta, CA (US)

(72) Inventors: Steven P. Trainoff, Santa Barbara, CA (US); Jeremy W. Jarrett, Odenton, MD (US)

(73) Assignee: Wyatt Technology, LLC, Goleta, CA (US)

( * ) Notice: Subject to any disclaimer, the term of this patent is extended or adjusted under 35 U.S.C. 154(b) by 627 days.

(21) Appl. No.: 16/912,705

(22) Filed: Jun. 25, 2020

(65) Prior Publication Data

US 2020/0408726 A1 Dec. 31, 2020

Related U.S. Application Data

(60) Provisional application No. 62/866,614, filed on Jun. 25, 2019.

(51) Int. Cl.
*G01N 30/00* (2006.01)

(52) U.S. Cl.
CPC . *G01N 30/0005* (2013.01); *G01N 2030/0025* (2013.01)

(58) Field of Classification Search
CPC .................................................. G01N 30/0005
USPC ......................................................... 422/70
See application file for complete search history.

(56) References Cited

U.S. PATENT DOCUMENTS

| | | | | |
|---|---|---|---|---|
| 2,819,402 | A * | 1/1958 | Bresky | G01N 21/03 250/428 |
| 3,090,861 | A * | 5/1963 | Haenni | G01N 21/03 250/576 |
| 3,307,971 | A * | 3/1967 | Kurtz | A61L 17/145 427/365 |
| 3,383,564 | A * | 5/1968 | Lalmond | H05K 3/4644 361/795 |

(Continued)

FOREIGN PATENT DOCUMENTS

| | | | |
|---|---|---|---|
| EP | 1879025 B1 | 10/2013 | |
| EP | 3023781 | * 5/2016 | |
| WO | WO-9944726 A1 | * 9/1999 | ............. B01D 57/00 |

OTHER PUBLICATIONS

Kassalainen, G. E. et al, Journal of Chromatography A 2003, 988, 285-295.*

(Continued)

*Primary Examiner* — Arlen Soderquist
(74) *Attorney, Agent, or Firm* — Leonard Guzman

(57) ABSTRACT

The present disclosure describes a field flow fractionator (FFF). In an embodiment, the FFF includes a spacer including a core, and a coating covering the core. In an embodiment, the FFF includes a spacer including a core, and a coating covering the core, a bottom block including pins, and a top block including mating holes to receive the pins, where the spacer is configured to be positioned between the top block and the bottom block. In an embodiment, the FFF includes a spacer including a core including an opening, a top side, and a bottom side, a first coating covering the top side, and a second coating covering the bottom side, a top block configured to press on the first coating along a first periphery of the opening, and a bottom block configured to press on the second coating along a second periphery of the opening.

7 Claims, 9 Drawing Sheets

(56) References Cited

U.S. PATENT DOCUMENTS

| | | | | |
|---|---|---|---|---|
| 3,500,276 | A * | 3/1970 | Hingorany | H01H 85/046 337/183 |
| 3,521,963 | A * | 7/1970 | Bader | G01N 21/03 356/244 |
| 3,545,872 | A * | 12/1970 | Noack | G01N 21/0317 356/246 |
| 3,552,865 | A * | 1/1971 | Leung | G01N 21/05 250/576 |
| 4,027,983 | A * | 6/1977 | Abrahams | F16K 7/14 356/246 |
| 4,147,621 | A * | 4/1979 | Giddings | B01D 61/246 210/321.75 |
| 4,214,981 | A * | 7/1980 | Giddings | B03B 5/00 210/695 |
| 4,737,268 | A * | 4/1988 | Giddings | G01N 30/0005 209/127.1 |
| 4,830,756 | A * | 5/1989 | Giddings | G01N 30/0005 210/748.01 |
| 4,894,172 | A * | 1/1990 | Williams | B01D 43/00 210/802 |
| 5,133,844 | A * | 7/1992 | Stevens | B03B 5/00 204/549 |
| 5,240,618 | A * | 8/1993 | Caldwell | G01N 30/0005 209/127.1 |
| 5,322,299 | A * | 6/1994 | Terai | F16J 15/0818 277/596 |
| 5,888,370 | A * | 3/1999 | Becker | B03C 5/028 435/284.1 |
| 5,993,632 | A * | 11/1999 | Becker | B03C 5/028 204/547 |
| 6,136,171 | A * | 10/2000 | Frazier | B81C 1/00357 209/127.1 |
| 6,180,906 | B1 * | 1/2001 | Trainoff | G01N 30/0005 209/127.1 |
| 6,365,050 | B1 * | 4/2002 | Cauchon | G01N 30/0005 210/800 |
| 6,641,708 | B1 * | 11/2003 | Becker | G01N 30/0005 204/547 |
| 6,692,627 | B1 * | 2/2004 | Russell | B01D 17/06 204/554 |
| 6,790,330 | B2 * | 9/2004 | Gascoyne | B03C 5/026 204/547 |
| 6,881,314 | B1 * | 4/2005 | Wang | B01J 19/0093 204/600 |
| 8,580,377 | B2 * | 11/2013 | Zhao | B32B 15/08 428/339 |
| 2002/0036142 | A1 * | 3/2002 | Gascoyne | B03C 5/028 204/547 |
| 2002/0095082 | A1 * | 7/2002 | Evans, III | A61M 5/007 600/407 |
| 2004/0000519 | A1 * | 1/2004 | Jiang | G01N 30/0005 210/656 |
| 2004/0011651 | A1 * | 1/2004 | Becker | G01N 30/0005 204/547 |
| 2004/0043479 | A1 * | 3/2004 | Briscoe | G01N 30/6095 435/288.5 |
| 2004/0178068 | A1 * | 9/2004 | Gascoyne | B03C 5/026 204/405 |
| 2004/0182708 | A1 * | 9/2004 | Russell | G01N 30/0005 204/554 |
| 2008/0003689 | A1 * | 1/2008 | Lee | G01N 30/0005 436/174 |
| 2009/0181478 | A1 * | 7/2009 | Cox | H01L 21/02603 977/773 |
| 2009/0301942 | A1 * | 12/2009 | Wyatt | G01N 30/0005 209/250 |
| 2010/0139420 | A1 * | 6/2010 | Ohlsson | B82Y 30/00 73/864.91 |
| 2011/0240127 | A1 | 10/2011 | Eberhart et al. | |
| 2011/0253535 | A1 * | 10/2011 | Moon | G01N 27/44773 204/627 |
| 2012/0144900 | A1 * | 6/2012 | Wyatt | G01N 30/0005 356/337 |
| 2012/0145278 | A1 | 6/2012 | Rösch et al. | |
| 2012/0148460 | A1 * | 6/2012 | Wyatt | G01N 30/0005 422/527 |
| 2012/0234731 | A1 * | 9/2012 | Senftleber | G01N 30/0005 209/39 |
| 2013/0310484 | A1 * | 11/2013 | Furukawa | C08L 63/00 523/201 |
| 2014/0066280 | A1 * | 3/2014 | Welz | B04B 11/02 494/23 |
| 2014/0187877 | A1 * | 7/2014 | Emken | A61B 5/14532 600/365 |
| 2015/0311546 | A1 * | 10/2015 | Yamakawa | B01D 71/38 429/413 |
| 2015/0346081 | A1 * | 12/2015 | Howard | G01N 21/11 356/246 |
| 2016/0023208 | A1 * | 1/2016 | Fisher | B29C 65/1467 156/272.8 |
| 2016/0252516 | A1 * | 9/2016 | Kim | H01J 49/02 506/12 |
| 2017/0241959 | A1 * | 8/2017 | Di Venere | G01N 30/0005 |
| 2019/0376601 | A1 * | 12/2019 | Lehr | F16J 15/122 |
| 2020/0049671 | A1 * | 2/2020 | Trainoff | B01D 57/02 |
| 2020/0156291 | A1 * | 5/2020 | Iguchi | B29C 43/18 |
| 2020/0408726 | A1 | 12/2020 | Trainoff et al. | |

OTHER PUBLICATIONS

Litzen, A. et al. Analytical Chemistry 1993, 63, 1001-1007. (Year: 1991).*
Myers, M. N., Journal of Microcolumn Separations 1997, 9, 151-162. (Year: 1997).*
Jiang, Y. et al, Journal of Microcolumn Separations 1997, 9, 261-273. (Year: 1997).*
Fulton, W. S. et al, Journal of Natural Rubber Research 1997, 12, 154-165. (Year: 1997).*
Myers, M. N. et al, Journal of Liquid Chromatography & Related Technologies 1997, 20, 2757-2775. (Year: 1997).*
Williams, S. K. R. et al, in "Encyclopedia of Analytical Chemistry" Meyers, R. A. (Ed.), John Wiley & Sons Ltd, Chichester, 2000, 7582-7608. (Year: 2000).*
Lee, D. et al, Journal of Chromatography A 2010, 1217, 1667-1673. (Year: 2010).*
Runyon, J. R. et al, Journal of Chromatography A 2011, 1218, 7016-7022. (Year: 2011).*
Miller, T. et al, Pharmaceutical Research 2012, 29, 448-459. (Year: 2012).*
Wagner, M. et al, Analytical Chemistry 2014, 86, 5201-5210. (Year: 2014).*
Zhang, H. et al, Nature Protochols 2019, 14, 1027-1053. (Year: 2019).*
Brimhall, S. L. et al, Separation Science and Technology 1981, 16, 671-689. (Year: 1981).*
Martin, M. et al, Chromatographia 1982, 16, 98-102. (Year: 1982).*
Giddings, J. C. et al, Journal of Chromatography 1983, 255, 359-379. (Year: 1983).*
Kirkland, J. J. et al, Macromolecules 1985, 18, 2305-2311. (Year: 1985).*
Gunderson, J. J. et al, Analytical Chemistry 1987, 59, 23-28. (Year: 1987).*
Koch, L., Analytical Chemistry 1990, 62, 777-779. (Year: 1990).*
Kirkland, J. J. et al, Journal of Chromatography 1992, 593, 339-355. (Year: 1992).*
Granger, J. et al, Separation Science and Technology 1992, 27, 1691-1709. (Year: 1992).*
Litzen, A. et al, Analytical Biochemistry 1993, 212, 469-480. (Year: 1993).*
Caldwell, K. D. et al, Analytical Chemistry 1993, 65. 1764-1772. (Year: 1993).*
Bernard, A. et al, Trends in Analytical Chemistry 1995, 14, 266-273. (Year: 1995).*

(56) References Cited

OTHER PUBLICATIONS

Wijnhoven, J. E. G. J. et al, Chromatographia 1996, 42, 409-415. (Year: 1996).*
Schimpf, M. E. et al, Colloids and Surfaces A: Physicochemical and Engineering Aspects 1997, 120, 87-100. (Year: 1997).*
Nilsson, M. et al, Biotechnology Progress 1999, 15, 158-163. (Year: 1999).*
Hartmann, R. L. et al, Journal of Membrane Science 2002, 209, 93-106. (Year: 2002).*
Sanz, R. et al, Journal of Chromatography A 2002, 966, 135-143. (Year: 2002).*
Park, I. et al, Journal of Chromatography B 2002, 780, 415-422. (Year: 2002).*
Moon, M. H. et al, Journal of Liquid Chromatography and Related Technologies 2003, 26, 2369-2379. (Year: 2003).*
Fraunhofer, W. et al, European Journal of Pharmaceutics and Biopharmaceutics 2004, 58, 369-383. (Year: 2004).*
Yohannes, G. et al, Analytical and Bioanalytical Chemistry 2004, 380, 757-766. (Year: 2004).*
Makan, A. C. et al, Macromolecules 2012, 45, 5247-5259. (Year: 2012).*
Yang, C.-H. et al, Electrophoresis 2014, 35, 316-322. (Year: 2014).*
International Search Report and Written Opinion in PCT/US2021/039264, dated Oct. 4, 2021.
International Preliminary Report on Patentability in PCT/US2021/039264, dated Jan. 5, 2023.

\* cited by examiner

SEALING STRUCTURE FOR A FIELD FLOW FRACTIONATOR

PRIORITY

This application claims priority to U.S. Provisional Patent Application No. 62/866,614, filed Jun. 25, 2019.

BACKGROUND

The present disclosure relates to field flow fractionators, and more specifically, to sealing a field flow fractionator.

SUMMARY

The present disclosure describes a field flow fractionator. In an exemplary embodiment, the field flow fractionator includes a spacer including a core, and a coating covering the core. In an embodiment, the core includes plastic. In a particular embodiment, the core is plastic. In an embodiment, the plastic is biaxially-oriented polyethylene terephthalate (BoPET). In an embodiment, the plastic is polycarbonate. In an embodiment, the core includes stainless steel. In a particular embodiment, the core is stainless steel. In an embodiment, the coating is silicone. In an embodiment, the coating is polytetrafluoroethylene (PTFE). In an embodiment, the coating is ethylene tetrafluoroethylene (ETFE). In an alternative embodiment, the coating covers only the top side of the core. In an alternative embodiment, the coating covers only the bottom side of the core.

In an exemplary embodiment, the field flow fractionator includes (1) a spacer including a core, and a coating covering the core, (2) a bottom block including pins, and (3) a top block including mating holes to receive the pins, where the spacer is configured to be positioned between the top block and the bottom block, where the spacer includes mating holes to receive the pins. In an embodiment, the core includes plastic. In a particular embodiment, the core is plastic. In an embodiment, the plastic is biaxially-oriented polyethylene terephthalate (BoPET). In an embodiment, the plastic is polycarbonate. In an embodiment, the coating is polytetrafluoroethylene (PTFE).

In an exemplary embodiment, the field flow fractionator includes (1) a spacer including (a) a core including an opening, a top side, and a bottom side, (b) a first coating covering the top side of the core, and (c) a second coating covering the bottom side of the core, (2) a top block configured to press on the first coating along a first periphery of the opening, and (3) a bottom block configured to press on the second coating along a second periphery of the opening. In an embodiment, the core includes plastic. In a particular embodiment, the core is plastic. In an embodiment, the plastic is biaxially-oriented polyethylene terephthalate (BoPET). In an embodiment, the plastic is polycarbonate. In an embodiment, the first coating is polytetrafluoroethylene (PTFE). In an embodiment, the second coating is polytetrafluoroethylene (PTFE).

DETAILED DESCRIPTION

Figure 1:
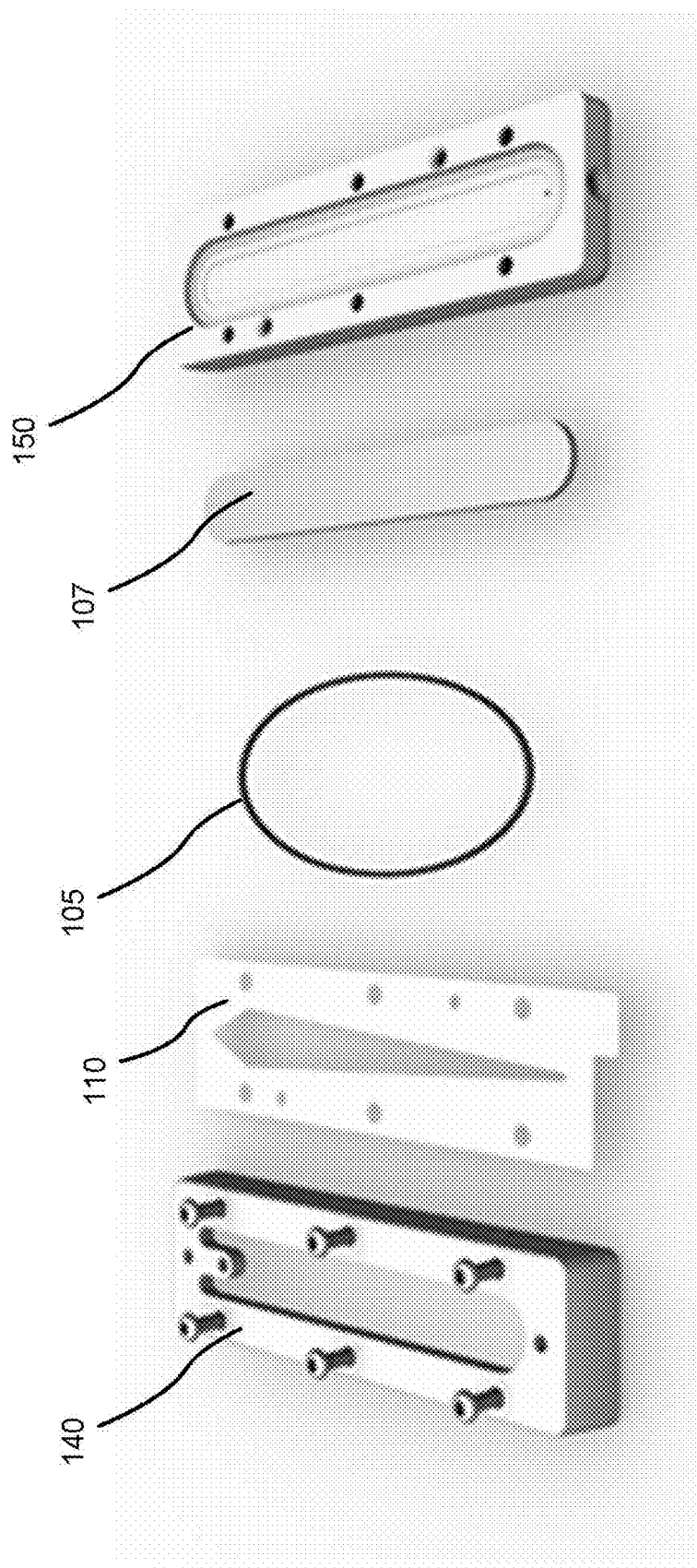
FIG. 1 depicts an existing field flow fractionator.

The present disclosure describes a field flow fractionator. In an exemplary embodiment, the field flow fractionator includes a spacer including a core, and a coating covering the core. In an embodiment, the core includes plastic. In a particular embodiment, the core is plastic. In an embodiment, the plastic is biaxially-oriented polyethylene terephthalate (BoPET). In an embodiment, the plastic is polycarbonate. In an embodiment, the core includes stainless steel. In a particular embodiment, the core is stainless steel. In an embodiment, the coating is silicone. In an embodiment, the coating is polytetrafluoroethylene (PTFE). In an embodiment, the coating is ethylene tetrafluoroethylene (ETFE). In an alternative embodiment, the coating covers only the top side of the core. In an alternative embodiment, the coating covers only the bottom side of the core.

In an exemplary embodiment, the field flow fractionator includes (1) a spacer including a core, and a coating covering the core, (2) a bottom block including pins, and (3) a top block including mating holes to receive the pins, where the spacer is configured to be positioned between the top block and the bottom block, where the spacer includes mating holes to receive the pins. In an embodiment, the core includes plastic. In a particular embodiment, the core is plastic. In an embodiment, the plastic is biaxially-oriented polyethylene terephthalate (BoPET). In an embodiment, the plastic is polycarbonate. In an embodiment, the coating is polytetrafluoroethylene (PTFE).

In an exemplary embodiment, the field flow fractionator includes (1) a spacer including (a) a core including an opening, a top side, and a bottom side, (b) a first coating covering the top side of the core, and (c) a second coating covering the bottom side of the core, (2) a top block configured to press on the first coating along a first periphery of the opening, and (3) a bottom block configured to press on the second coating along a second periphery of the opening. In an embodiment, the core includes plastic. In a particular embodiment, the core is plastic. In an embodiment, the plastic is biaxially-oriented polyethylene terephthalate (BoPET). In an embodiment, the plastic is polycarbonate. In an embodiment, the first coating is polytetrafluoroethylene (PTFE). In an embodiment, the second coating is polytetrafluoroethylene (PTFE).

In an embodiment, the spacer is soft enough to form a robust seal, while being simultaneously rigid enough to avoid extrusion and to set a reproducible channel thickness. For example, the spacer could be a laminated composite with a rigid core and a soft coating to facilitate the seal.

In an alternate embodiment, a composite seal such as glass filled PTFE could be used (e.g., Gylon® 3500 series). The embedded glass microspheres in this material could resist compression while maintaining a good seal.

Even if the seal were maintained while pressurized, the internal pressure could generate a lateral force on the spacer, which could cause the spacer to extrude and compromise the cell geometry. In order to combat lateral extrusion, in a embodiment, a plurality of pins in the top block along with mating holes in the spacer and bottom block could be used to prevent extrusion. Alternatively, in an embodiment, the pins could be put in the bottom block with mating holes in the upper block. The number of pins required to hold the spacer in place could depend on the rigidity of the spacer material and the ultimate pressure at which the FFF system would operate.

Definitions

Particle

A particle may be a constituent of a liquid sample aliquot. Such particles may be molecules of varying types and sizes, nanoparticles, virus like particles, liposomes, emulsions, bacteria, and colloids. These particles may range in size on the order of nanometer to microns.

Analysis of Macromolecular or Particle Species in Solution

The analysis of macromolecular or particle species in solution may be achieved by preparing a sample in an appropriate solvent and then injecting an aliquot thereof into a separation system such as a liquid chromatography (LC) column or field flow fractionation (FFF) channel where the different species of particles contained within the sample are separated into their various constituencies. Once separated, generally based on size, mass, or column affinity, the samples may be subjected to analysis by means of light scattering, refractive index, ultraviolet absorption, electrophoretic mobility, and viscometric response.

Field Flow Fractionation

The separation of particles in a solution by means of field flow fractionation, FFF, was studied and developed extensively by J. C. Giddings beginning in the early 1960s. The basis of these techniques lies in the interaction of a channel-constrained sample and an impressed field applied perpendicular to the direction of flow. Among those techniques of current interest is cross flow FFF, often called symmetric flow (SFlFFF), where an impressed field is achieved by introducing a secondary flow perpendicular to the sample borne fluid within the channel. There are several variations of this technique including asymmetric flow FFF (i.e., A4F), and hollow fiber (H4F) flow separation.

Other FFF techniques include (i) sedimentation FFF (SdFFF), where a gravitational/centrifugal cross force is applied perpendicular to the direction of the channel flow, (ii) electrical FFF (EFFF), where an electric field is applied perpendicular to the channel flow, and (ii) thermal FFF (ThFFF), where a temperature gradient is transversely applied.

Common to all these methods of field flow fractionation is a fluid, or mobile phase, into which is injected an aliquot of a sample whose separation into its constituent fractions is achieved by the application of a cross field. Many of the field flow fractionators allow for the control and variation of the strength of the cross field during the time the sample aliquot flows down the channel, be it electrical field, cross flow, thermal gradient, or other variable field.

Symmetric Flow Cross Flow Fractionator (SFlFFF)

As an illustration of the separation of particles by field flow fractionation, a simplification of perhaps the most straightforward system, a SFlFFF, is described. A sample is injected into an inlet port along with the spending mobile phase. The sample is allowed to undergo a so-called "relaxation phase," where there is no applied channel flow, but larger particles are forced further down the height of the channel than smaller particles by the constantly applied cross flow. Once the channel flow is resumed, the sample aliquot begins to undergo non-steric separation while it moves down the length channel with the smaller particles leading the larger ones, as they inhabit a region of the cross section of the channel flow nearer the center of the height of the channel where the channel flow is most swift. By increasing the cross flow rate, the separation of all species continues while the larger fractions begin to trail further behind their smaller sized companions. After exiting the channel through the outlet port the fractionated sample may be analyzed using various detectors.

Asymmetric Flow FFF (A4F)

An asymmetric flow FFF (A4F) is generally considered a variation of the earlier developed SFlFFF. The elements of an A4F channel assembly are depicted in FIG. 1. An A4F channel assembly may include (1) a bottom assembly structure 150 holding a liquid-permeable frit 107 surrounded by a sealing O-ring 105, (2) a permeable membrane that lies on frit 107, (3) a spacer 110 of thickness from about 75 µm to 800 µm into which has been cut a cavity, and (4) a top assembly structure generally holding a transparent plate of polycarbonate material or glass.

The resulting sandwich is held together with bolts or other means, such as applied pressure adequate to keep the channel sealed against leaks, where such pressure may be applied by vise or clamping mechanism so long as it is able to provide relatively even pressure across the channel assembly such that no leaks occur. The generally coffin-shaped or tapered cavity in spacer 110 serves as the channel in which separation will occur. The top assembly structure 140 usually contains three holes, called ports, that pass through the top plate 110 and are centered above the channel permitting the attachment of fittings thereto. These ports are (a) a mobile phase inlet port located near the beginning of the channel and through which is pumped the carrier liquid, the so-called mobile phase, (b) a sample port, downstream of the inlet port, into which an aliquot of the sample to be separated is introduced to the channel and focused thereunder, and (c) an exit port through which the fractionated aliquot leaves the channel near the end of the cavity.

Current Technologies

FIG. 1 depicts an existing field flow fractionator (FFF) including a top block 140, a spacer 110, an O-ring 105, a frit 107, and a bottom block 150. A field flow fractionator may include a top block, a spacer, and a bottom block, where the bottom block includes an O-ring and a frit. For example, the field flow fractionator depicted in FIG. 1 may be an asymmetric field flow fractionator (AF4). An AF4 assembly consists of number of number of parts as shown in FIG. 1. There is a top plate/top block 140, a spacer 110, an O-ring 105, an ultrafiltration membrane, and a bottom assembly/bottom block 150.

The spacer serves a number of roles, which require conflicting material properties. It sets the height of the separation channel that controls, along with the analysis method, the fractionation size range, resolution, and sample dilution. It also serves as a seal that prevents fluid from escaping the channel except through the inlet and outlet ports. Lastly, it sets the lateral dimensions of the separation channel. The spacer, when used to define the channel geometry must have a well-defined and reproducible thickness. It also needs to be chemically inert.

As such, common material choices for the spacer are hard materials such as biaxially-oriented polyethylene terephthalate (BoPET) for spacers between 0.1 mm and 0.49 mm. For spacers from 0.49 mm to 3 mm, 316 stainless steel sheet is commonly used. Unfortunately these materials are not conformable and tend to make poor seals unless very high clamping forces are used. Even with such high clamping forces, the upper pressure limit for which they would maintain a seal is often less than 30 bar. If a soft sealing material were used to improve the seal integrity and reduce the clamping forces required, the seal gasket could extrude horizontally and could compromise the structural integrity of the channel. Thus, there is a need to seal a field flow fractionator via spacers, coatings, and blocks that prevent such extrusion and that preserve the structural integrity of the channel.

Figure 2A:
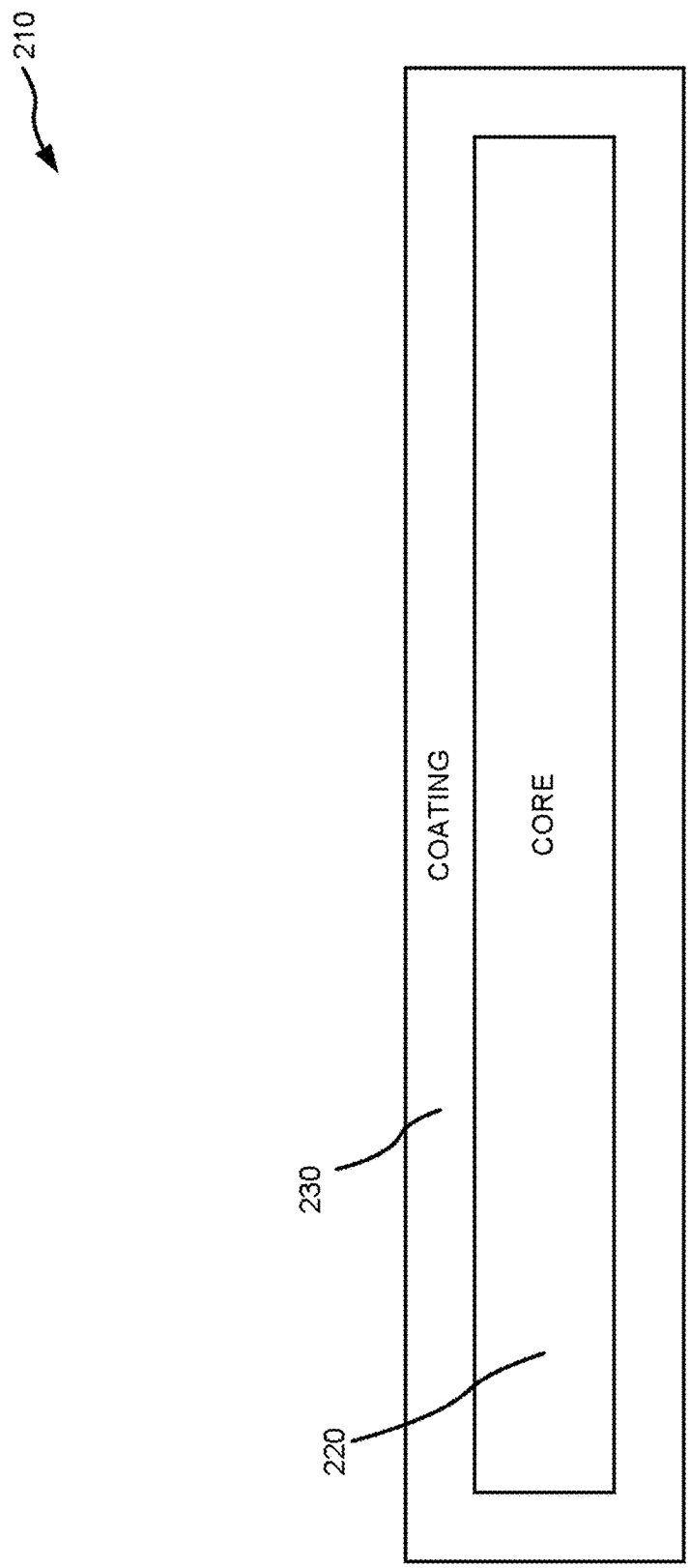
FIG. 2A depicts a field flow fractionator in accordance with an exemplary embodiment.

Referring to FIG. 2A, in an exemplary embodiment, the field flow fractionator includes a spacer 210 including a core 220, and a coating 230 covering core 220. In an embodiment, core 220 includes plastic. In a particular embodiment, core 220 is plastic. In an embodiment, the plastic is biaxially-oriented polyethylene terephthalate (BoPET). In an embodiment, the plastic is polycarbonate. In an embodiment, core 220 includes stainless steel. In a particular embodiment, core 220 is stainless steel. In an embodiment, coating 230 is silicone. In an embodiment, coating 230 is polytetrafluoroethylene (PTFE). In an embodiment, coating 230 is ethylene tetrafluoroethylene (ETFE). In an alternative embodiment, coating 230 covers only the top side of core 220. In an alternative embodiment, coating 230 covers only the bottom side of core 220.

Top Block with Pins

Figure 2B:
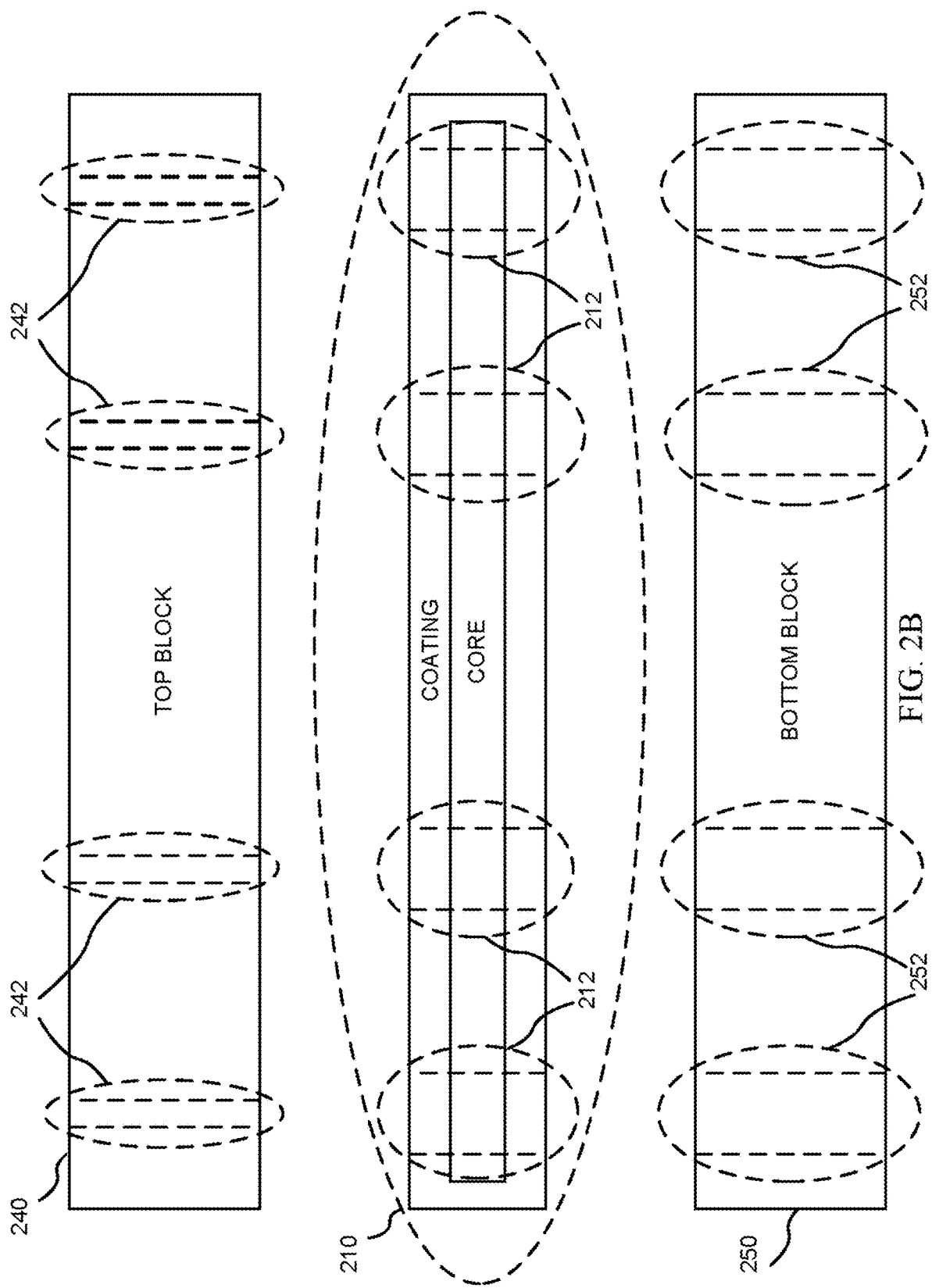
FIG. 2B depicts a field flow fractionator in accordance with an embodiment.

In further embodiment, the field flow fractionator further includes (a) a top block including pins, and (b) a bottom block including mating holes to receive the pins, where the spacer is configured to be positioned between the top block and the bottom block, where the spacer includes mating holes to receive the pins. Referring to FIG. 2B, in further embodiment, the field flow fractionator further includes (a) a top block 240 including pins 242, and (b) a bottom block 250 including mating holes 252 to receive pins 242, where spacer 210 is configured to be positioned between top block 240 and bottom block 250, where spacer 210 includes mating holes 212 to receive pins 242.

Bottom Block with Pins

Figure 2C:
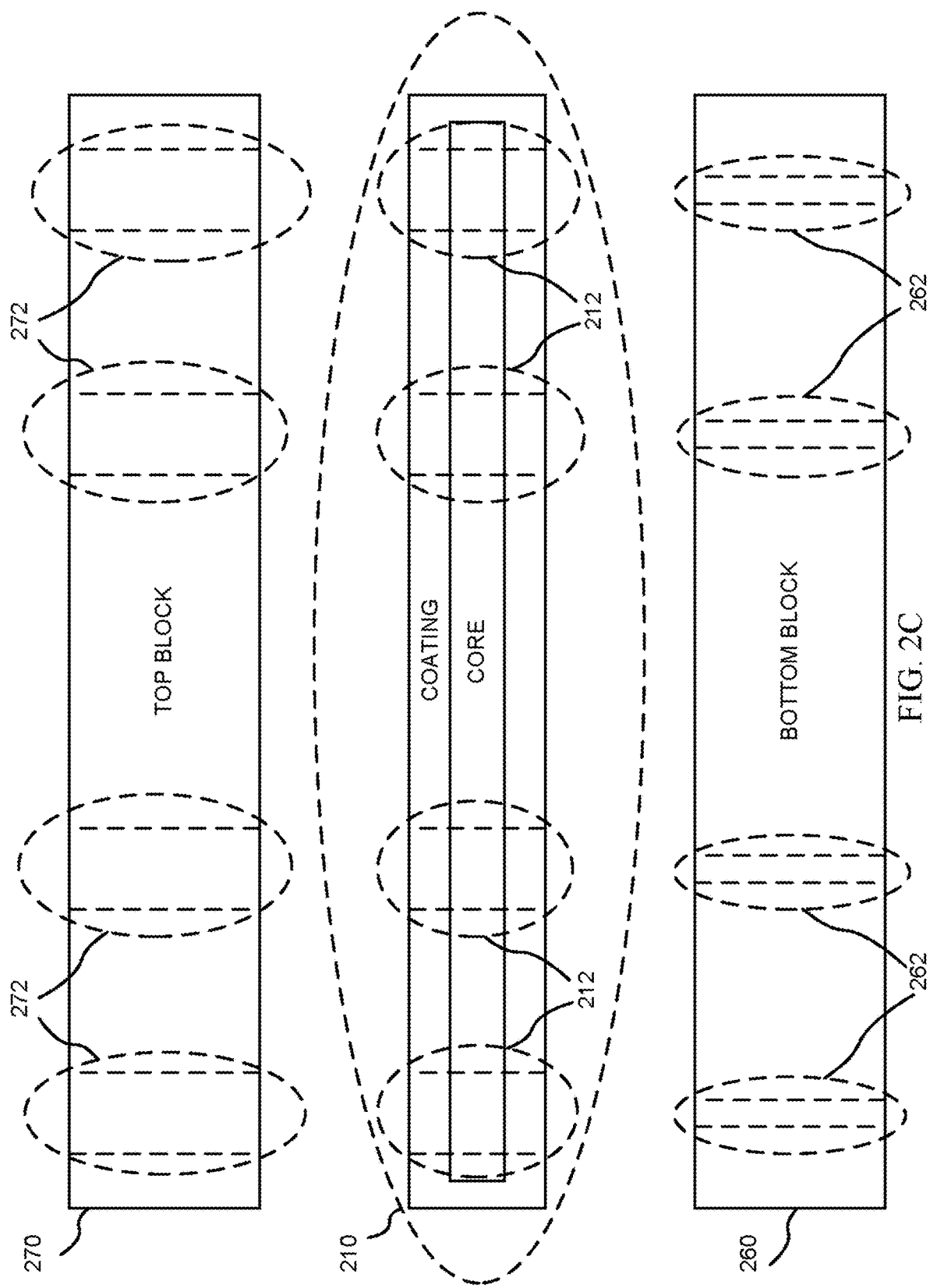
FIG. 2C depicts a field flow fractionator in accordance with an embodiment.

In further embodiment, the field flow fractionator further includes (a) a bottom block including pins, and (b) a top block including mating holes to receive the pins, where the spacer is configured to be positioned between the top block and the bottom block, where the spacer includes mating holes to receive the pins. Referring to FIG. 2C, in further embodiment, the field flow fractionator further includes (a) a bottom block 260 including pins 262, and (b) a top block 270 including mating holes 272 to receive pins 262, where spacer 210 is configured to be positioned between top block 270 and bottom block 260, where spacer 210 includes mating holes 212 to receive pins 262.

Spacer with Blocks, Pins, and Holes

Figure 3:
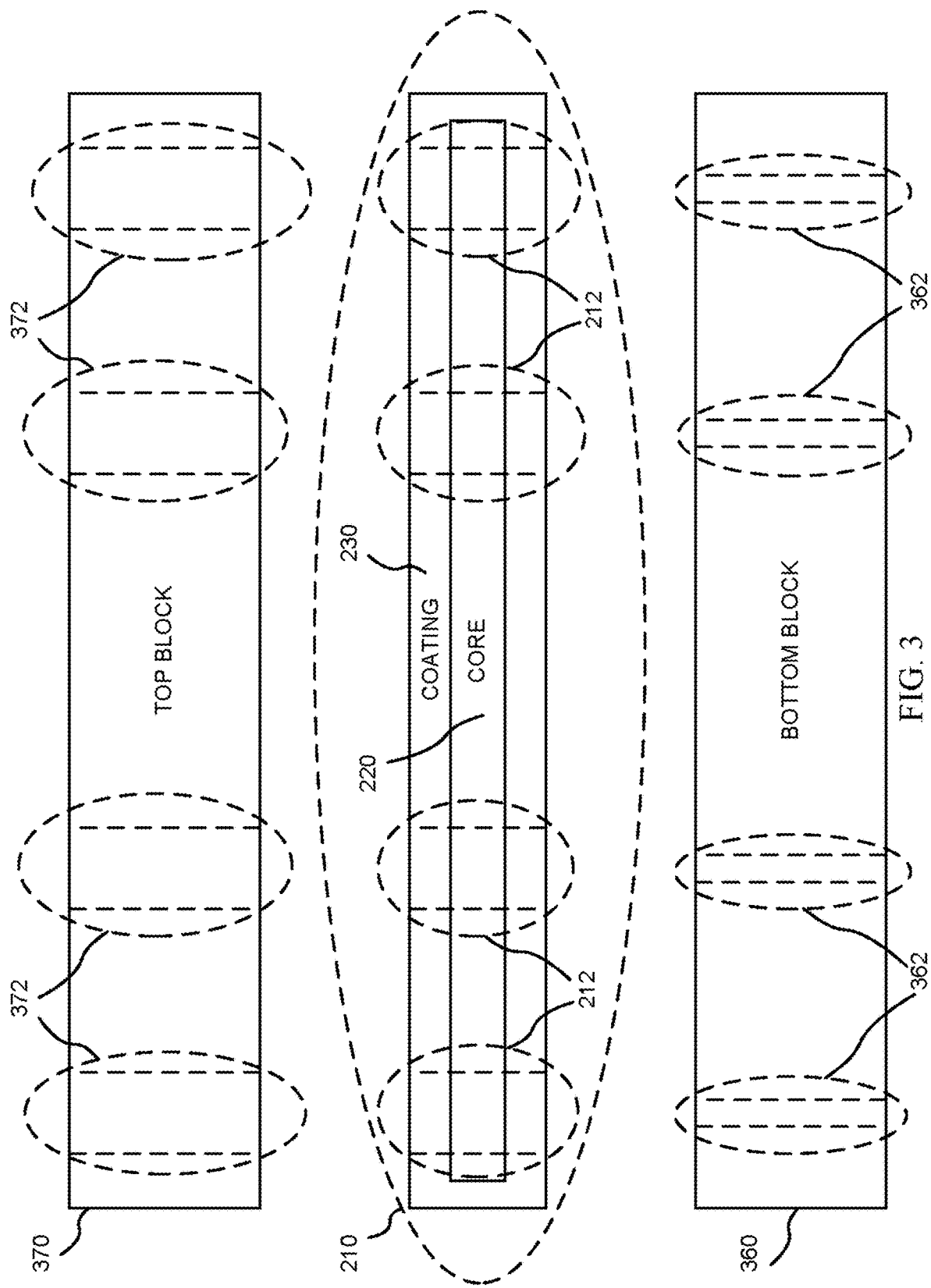
FIG. 3 depicts a field flow fractionator in accordance with an exemplary embodiment.

Referring to FIG. 3, in an exemplary embodiment, the field flow fractionator includes flow fractionator includes (1) spacer 210 including core 220, and a coating 230 covering core 220, (2) a bottom block 360 including pins 362, and (3) a top block 370 including mating holes 372 to receive pins 362, where spacer 210 is configured to be positioned between top block 370 and bottom block 360, where spacer 210 includes mating holes 212 to receive pins 362. In an embodiment, core 220 includes plastic. In a particular embodiment, core 220 is plastic. In an embodiment, the plastic is biaxially-oriented polyethylene terephthalate (BoPET). In an embodiment, the plastic is polycarbonate. In an embodiment, coating 230 is polytetrafluoroethylene (PTFE).

Spacer with Blocks

Figure 4:
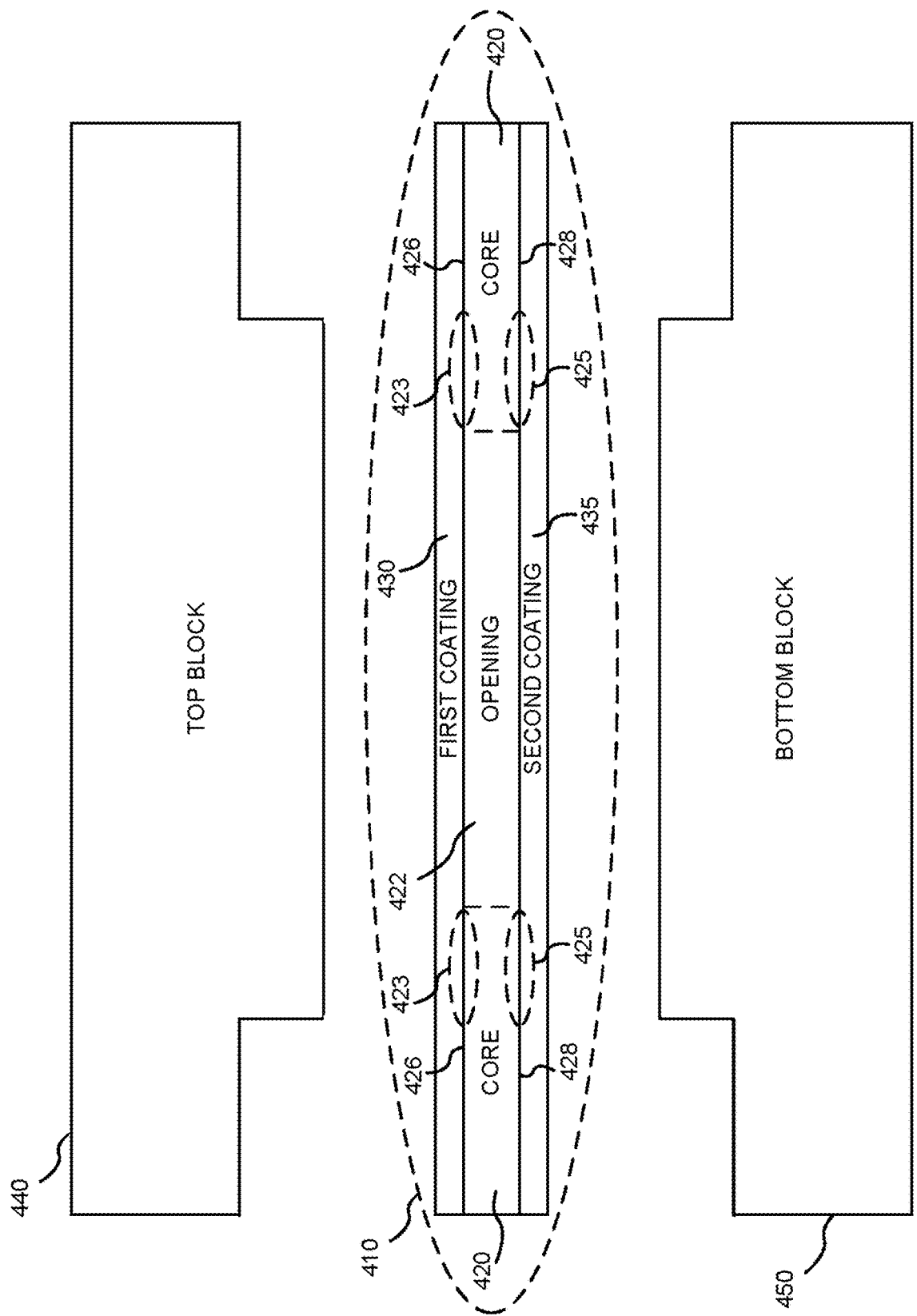
FIG. 4 depicts a field flow fractionator in accordance with an exemplary embodiment.

Referring to FIG. 4, in an exemplary embodiment, the field flow fractionator includes (1) a spacer 410 including (a) a core 420 including an opening 422, a top side 426, and a bottom side 428, (b) a first coating 430 covering top side 426 of core 420, and (c) a second coating 435 covering bottom side 428 of core 420, (2) a top block 440 configured to press on first coating 430 along a first periphery 423 of opening 422, and (3) a bottom block 450 configured to press on second coating 435 along a second periphery 425 of opening 422. In an embodiment, core 420 includes plastic. In a particular embodiment, core 420 is plastic. In an embodiment, the plastic is biaxially-oriented polyethylene terephthalate (BoPET). In an embodiment, the plastic is polycarbonate. In an embodiment, first coating 430 is polytetrafluoroethylene (PTFE). In an embodiment, second coating 435 is polytetrafluoroethylene (PTFE).

Alternatives

Figure 5:
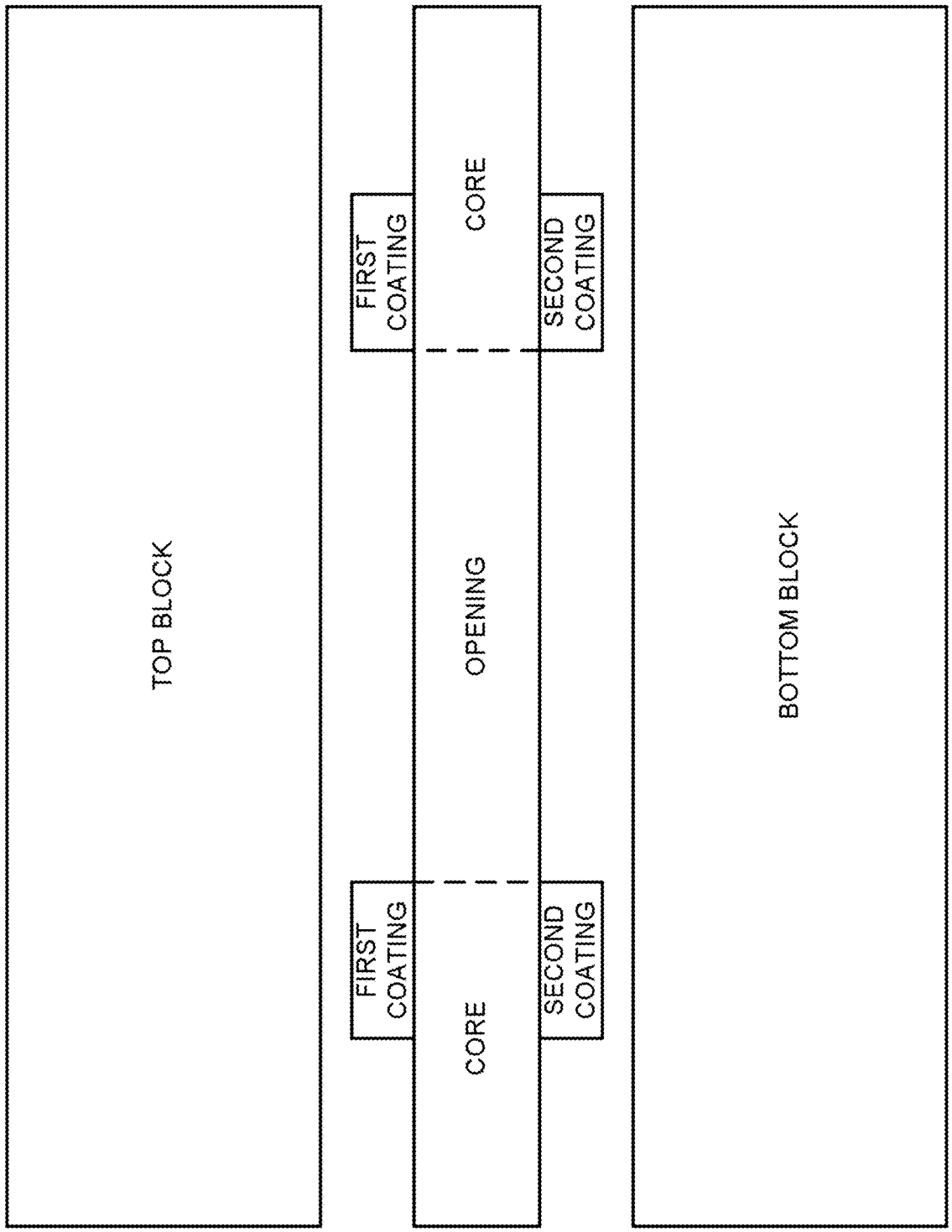
FIG. 5 depicts a field flow fractionator in accordance with an embodiment.

In an embodiment, as depicted in FIG. 5, the field flow fractionator includes (1) a spacer including (a) a core including an opening, (b) a first coating covering the core along a first periphery of the opening, and (c) a second coating covering the core along a second periphery of the opening, (2) a top block configured to press on the first coating, and (3) a bottom block configured to press on the second coating. In an embodiment, the core includes stainless steel. In an embodiment, the core is stainless steel. In an embodiment, the core includes plastic. In an embodiment, the core is plastic. In a particular embodiment, the plastic is biaxially-oriented polyethylene terephthalate (BoPET). In an embodiment, the first coating is silicone. In an embodiment, the first coating is polytetrafluoroethylene (PTFE). In an embodiment, the first coating is ethylene tetrafluoroethylene (ETFE). In an embodiment, the second coating is silicone. In an embodiment, the second coating is polytetrafluoroethylene (PTFE). In an embodiment, the second coating is ethylene tetrafluoroethylene (ETFE). In an alternative embodiment, the field flow fractionator includes (1) a spacer including (a) a core including an opening, (b) a coating covering the core along a periphery of the opening, and (2) a top block configured to press on the coating. In an alternative embodiment, the field flow fractionator includes (1) a spacer including (a) a core including an opening, and (b) a coating covering the core along a periphery of the opening, and (2) a bottom block configured to press on the coating.

Figure 6:
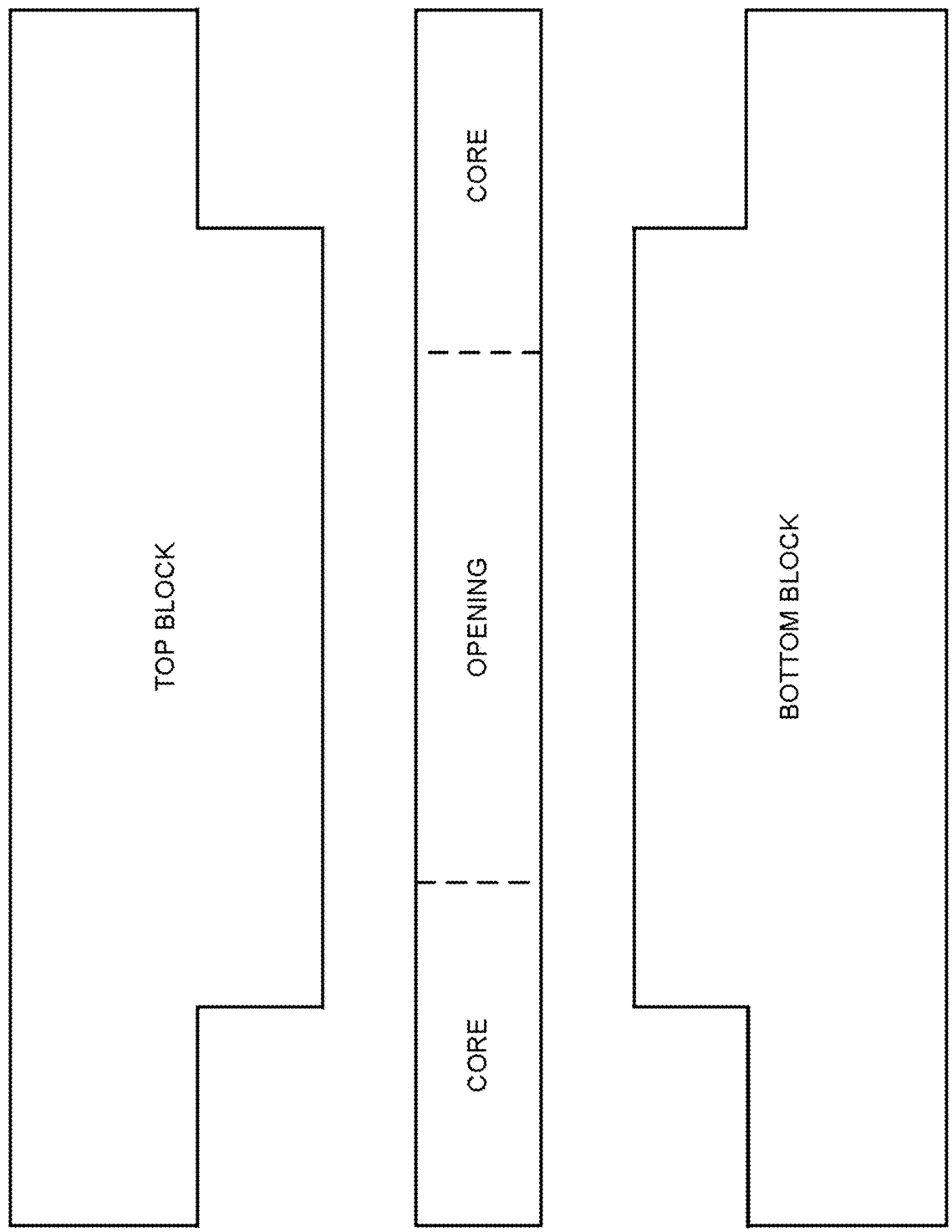
FIG. 6 depicts a field flow fractionator in accordance with an embodiment.

In an embodiment, as depicted in FIG. 6, the field flow fractionator includes (1) a spacer including an opening, (2) a top block configured to press on the spacer along a first periphery of the opening, and (3) a bottom block configured to press on the spacer along a second periphery of the opening. In an embodiment, the spacer includes stainless steel. In an embodiment, the spacer is stainless steel. In an embodiment, the spacer includes plastic. In an embodiment, the spacer is plastic. In a particular embodiment, the plastic is biaxially-oriented polyethylene terephthalate (BoPET).

Figure 7:
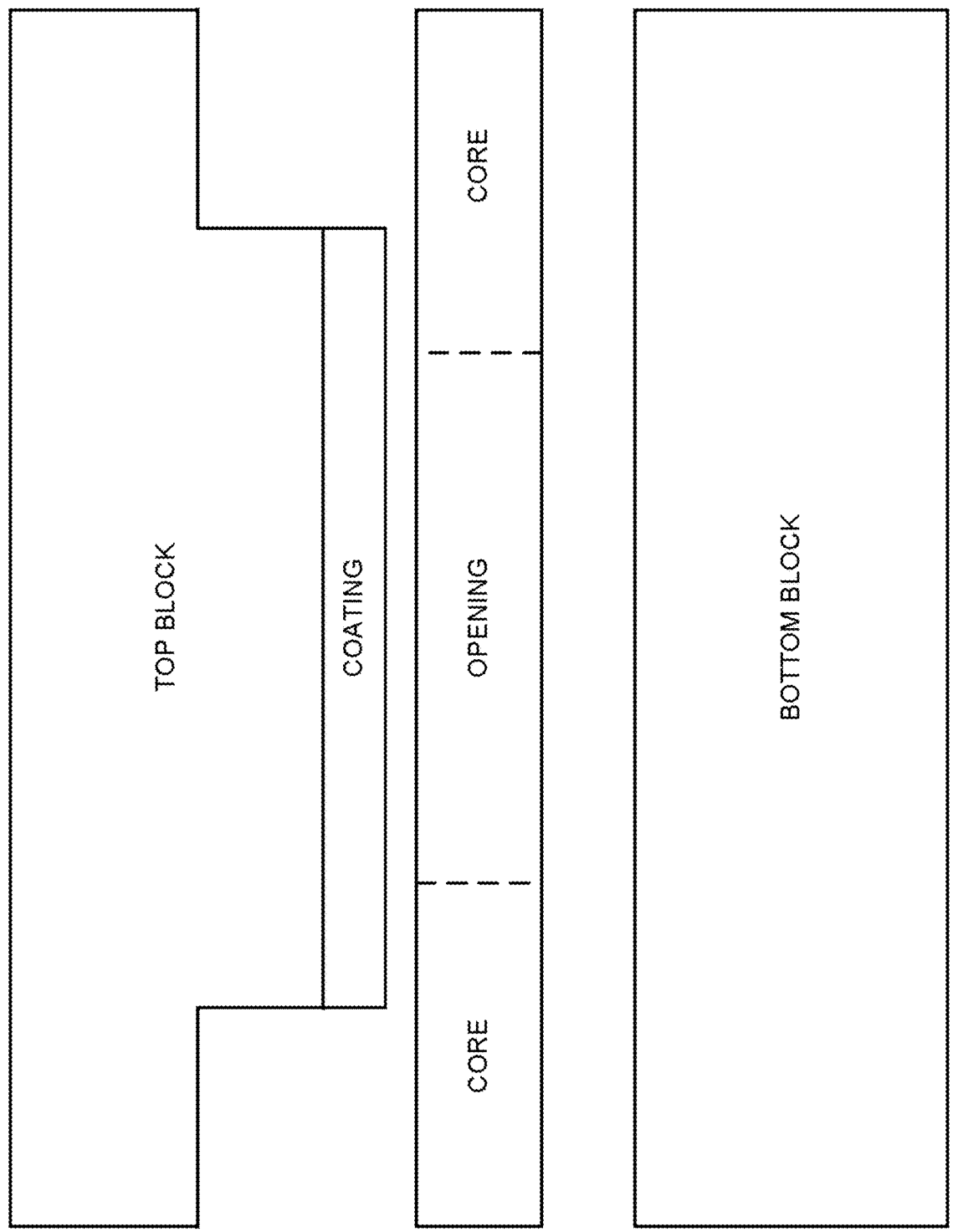
FIG. 7 depicts a field flow fractionator in accordance with an embodiment.

In an exemplary embodiment, as depicted in FIG. 7, the field flow fractionator includes (1) a spacer including an opening, a top side, and a bottom side, and (2) a top block including a bottom side and a coating covering the bottom side of the top block, resulting in a coated bottom side of the top block, where the coated bottom side of the top block is configured to press on the top side of the spacer along a periphery of the opening. In an embodiment, the spacer includes stainless steel. In an embodiment, the spacer is stainless steel. In an embodiment, the spacer includes plastic. In an embodiment, the spacer is plastic. In a particular embodiment, the plastic is biaxially-oriented polyethylene terephthalate (BoPET). In an embodiment, the coating is silicone. In an embodiment, the coating is polytetrafluoroethylene (PTFE). In an embodiment, the coating is ethylene tetrafluoroethylene (ETFE). In an alternative embodiment, the field flow fractionator includes (1) spacer including an core including an opening, a top side, and a bottom side, and (b) a spacer coating covering the top side of the core, and (2) a top block including a bottom side and a top block coating covering the bottom side of the top block, resulting in a coated bottom side of the top block, where the coated bottom side of the top block is configured to press on the top side of the spacer along a periphery of the opening. In an alternative embodiment, the field flow fractionator includes (1) spacer including an core including an opening, a top side, and a bottom side, and (b) a spacer coating covering the bottom side of the core, and (2) a top block including a bottom side and a top block coating covering the bottom side of the top block, resulting in a coated bottom side of the top block, where the coated bottom side of the top block is configured to press on the top side of the spacer along a periphery of the opening. In an alternative embodiment, the field flow fractionator includes (1) spacer including an core including an opening, a top side, and a bottom side, (b) a first spacer coating covering the top side of the core, and (c) a second spacer coating covering the bottom side of the core, and (2) a top block including a bottom side and a top block coating covering the bottom side of the top block, resulting in a coated bottom side of the top block, where the coated bottom side of the top block is configured to press on the top side of the spacer along a periphery of the opening.

Example

For example, spacers made of biaxially-oriented polyethylene terephthalate (BoPET) with silicone coating (e.g., DOWSIL™ 1-2755), spacers made of 316 Stainless with silicone, and spacers made of stainless steel with PTFE coating were tested. All such spacers were tested by filling the cell assembly with water, capping the ports except for one, and pressurizing the channel through the open port to 30 bar. The FFF system was sealed, and the pressure was monitored over time. The rate of pressure loss was a measure of the leak rate. Success was defined as holding the applied pressure with 2% over a span of 30 minutes. All non-composite spacer configurations that were tested failed this test within 5 minutes. The spacers that had been coated with PTFE or with silicone (e.g., Dow-Sil) passed this test.

Also, the spacers made of BoPET could require more pins than spacers made of stainless steel. The spacers made of Gylon could seal well, but could require a large number of restraining pins or a restraining flange to resist extrusion.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A field flow fractionator comprising:
    a spacer comprising
        a core comprising an opening, a top side, and a bottom side,
        a first coating covering a portion of the top side of the core along a first periphery of the opening, and
        a second coating covering a portion of the bottom side of the core along a second periphery of the opening;
    wherein a cavity in the spacer serves as a separation channel,
        wherein a height of the spacer sets a height of the separation channel, wherein
    lateral dimensions of the cavitiy define lateral dimensions of the separation channel;
    a top block configured to press on the first coating; and
    a bottom block configured to press on the secon coating.

2. The field flow fractionator of claim 1 wherein the core comprises plastic.

3. The field flow fractionator of claim 2 wherein the plastic is biaxially-oriented polyethylene terephthalate (BoPET).

4. The field flow fractionator of claim 2 wherein the plastic is polycarbonate.

5. The field flow fractionator of claim 1 wherein the first coating is polytetrafluoroethylene (PTFE).

6. The field flow fractionator of claim 1 wherein the second coating is polytetrafluoroethylene (PTFE).

7. The field flow fractionator of claim 1, wherein each of the first and second coatings comprises a material that does not horizontally extrude under compression by the top and bottom blocks.

* * * * *